United States Patent

Blum

[15] 3,695,254
[45] Oct. 3, 1972

[54] METHOD AND APPARATUS FOR DETERMINING VOLUME OF A LUNG

[72] Inventor: Alvin S. Blum, Coral Gables, Fla.
[73] Assignee: Ohio Nuclear, Inc., Mentor, Ohio
[22] Filed: June 7, 1971
[21] Appl. No.: 150,785

Related U.S. Application Data

[63] Continuation of Ser. No. 710,818, March 6, 1968, abandoned.

[52] U.S. Cl. ............... 128/2.08, 73/194 R, 128/1.1, 250/43.5 R, 250/106 T
[51] Int. Cl. ........................................... A61b 5/08
[58] Field of Search....128/2.08, 2 R, 1.1, 1.2, 145.8; 73/194 R; 250/43.5 R, 43.5 FC, 43.5 FL, 106 T

[56] References Cited

UNITED STATES PATENTS

| | | | |
|---|---|---|---|
| 3,033,195 | 5/1962 | Gilroy et al. | 128/145.8 |
| 3,097,638 | 7/1963 | Streimer | 128/145.8 |
| 3,268,728 | 8/1966 | Stoddart et al. | 128/2 X |

FOREIGN PATENTS OR APPLICATIONS

702,749   1/1965   Canada.....................250/43.5

OTHER PUBLICATIONS

Bartlett, R. G. et al., Journ. Of Applied Physiology, Vol. 14, 1959, pp. 89–96.
Comroe, J. H. et al., Jorn. of Applied Physiology, Vol. 14, 1959, pp. 439–444.
Hershberg et al., Amer. Journ. of Med. Electronics, July–Sept. 1963, pp. 207–211.
Thompson, S. et al, I.R.E. Trans. on Med. Electronics, Dec. 1959, pp. 287–290.

Primary Examiner—Kyle L. Howell
Attorney—Fay, Sharpe and Mulholland

[57] ABSTRACT

A method and apparatus for dispensing a known and unknown volume of gas into the lungs of a vertebrate, for processing pulsatile input data from a sensing system for direct digital calibration and readout of the measurement, and for externally determining the volume and gas flow rate of each lung in a vertebrate.

15 Claims, 6 Drawing Figures

INVENTOR.
ALVIN S. BLUM

ATTORNEY

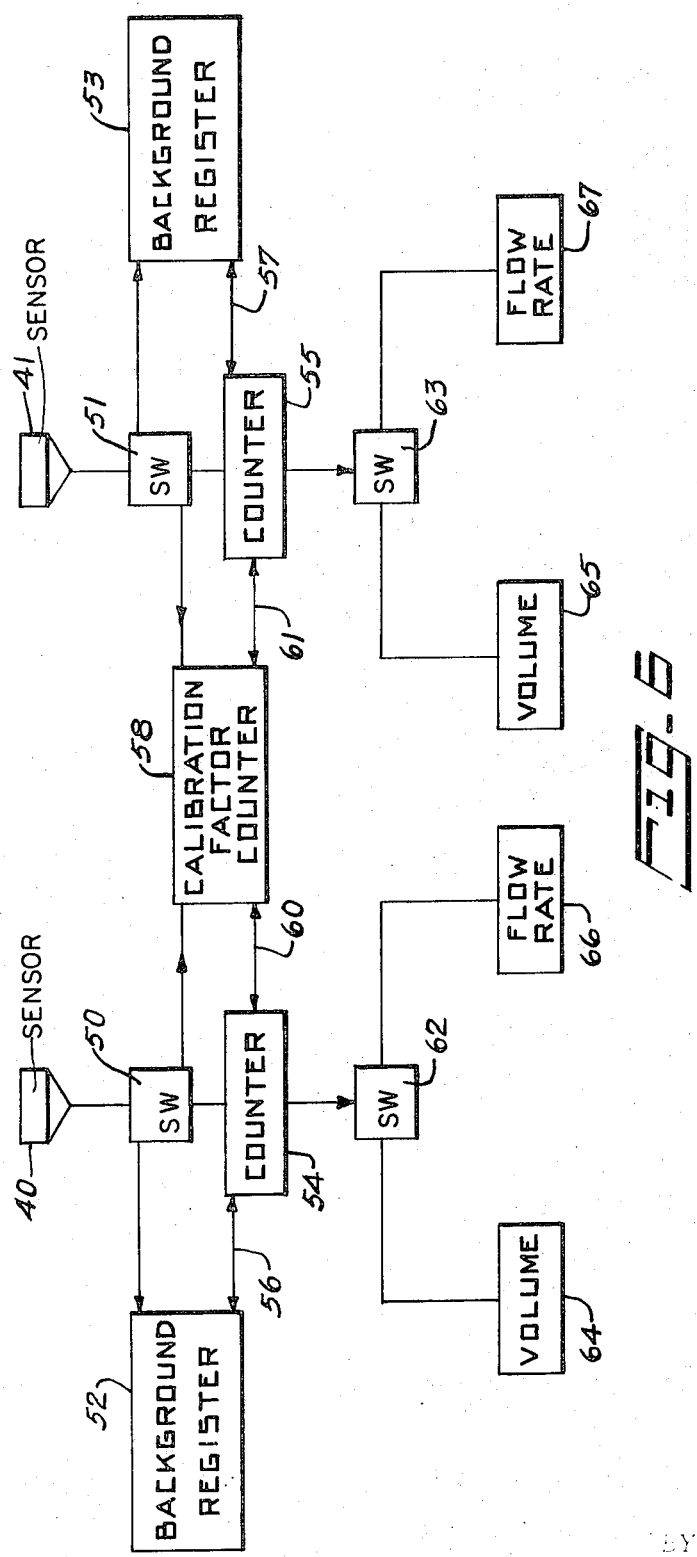

METHOD AND APPARATUS FOR DETERMINING VOLUME OF A LUNG

This application is a continuation of application Ser. No. 710,818, filed Mar. 6, 1968, now abandoned.

BACKGROUND OF THE INVENTION

This invention relates to a new and improved method and apparatus for determining the volume and gas flow rate in each lung in man, and, more particularly, to a method and apparatus for externally determining the volume and gas flow rate of each lung by dispensing a relatively small known volume of a homogenous mixture of radioactive gas and non-radioactive gas into the external entryway to the trachea at the beginning of a patient's inhalation cycle, externally measuring the radiation from the small known volume of the mixture in each lung, purging the known volume from the lungs, filling the cavity in the lungs with an unknown volume of the mixture, externally measuring the radiation from each of the lungs filled with the unknown volume of the mixture at various stages during breathing maneuvers, and processing the measured radiation data to determine both the volume and gas flow rate of each lung.

As is perhaps well-known, the present methods used to quantitatively determine the volume of each lung in man require a physician or technician to pass a tube through the trachea to the branching point leading to each lung. The gases passing into and out of each lung through the tubes are collected to determine the volume of each lung. The insertion of tubes through the patient's trachea is both hazardous and painful. In the past, various radioactive gases have been used to obtain pulmonary function data, but the techniques and apparatus utilized have been complex in nature and provide only relative values of pulmonary functions for indeterminate portions of the lungs.

SUMMARY OF THE INVENTION

The present invention relates to a new and improved method and apparatus for externally determining the volume of each lung in man, and for externally determining the flow rate of the gas into and out of each lung. The method of determining the volume and the gas flow rate of each lung in a particular patient includes the external sensing and storage of the background radiation of each lung. The known volume of a homogenous mixture of radioactive and non-radioactive gases is dispensed into the external entryway to the trachea of a patient at the beginning of an inhalation cycle in order to place the known volume of the mixture in the lungs. The known volume of the mixture moves as a slug into the lungs, followed by non-radioactive gas. The radiation from each lung containing the known volume of the mixture is externally sensed for a preset time interval and the data is processed and stored as a calibration factor in the data processing system. The known volume of the mixture in the lungs is then removed by breathing maneuvers. Thereafter, the lung cavities are filled with an unknown volume of the mixture. The radiation from each lung containing the unknown volume of the mixture is externally sensed for a preset time interval at various stages during breathing maneuvers and the data is processed to provide the volume and gas flow rate of each lung in absolute units by direct digital computation and readout of the pulsatile measuring system.

The apparatus includes a dispensing system connected to a source of the mixture and the mouth of a patient for dispensing the mixture into the patient's lungs, and a detecting system for externally sensing the radiation from each lung and for determining the volume of each lung and the flow rate of the mixture in each lung. The dispensing system includes a measuring means for providing a known volume of the mixture, and a control means for dispensing the known volume of the mixture into the lungs and for dispensing the mixture to fill the lungs with an unknown volume. The detecting system includes sensing means for externally sensing the radiation from each lung of the patient, and a data processing system connected to the sensing means. The data processing system processes the sensed data to determine the volume of each lung in absolute units and for determining the gas flow rate in each lung in absolute units during breathing maneuvers.

It is an object of this invention to provide a non-complex method for determining the volume of a particular lung in vertebrates.

It is another object of this invention to provide a non-complex apparatus for determining the volume of a particular lung in vertebrates.

A further object of this invention is to provide an apparatus for determining the volume of each lung of a man by introducing a mixture of radioactive and non-radioactive gases into the lungs by dispensing the mixture into the external entryway to the trachea leading to the lungs.

A further object of this invention is to provide an apparatus to provide in absolute values the volume and flow rate of each lung in a patient.

An additional object of this invention is to provide a method and apparatus for quickly obtaining the volume data of each lung and the gas flow rate in each lung of a patient.

In accordance with these and other objects which will be apparent hereinafter, the instant invention will now be described with particular reference to the accompanying drawings.

BRIEF DESCRIPTION OF THE DRAWINGS

In the drawings:

FIG. 6, is a detailed block diagram of the detecting system.

DESCRIPTION OF THE PREFERRED EMBODIMENT

Figure 1:
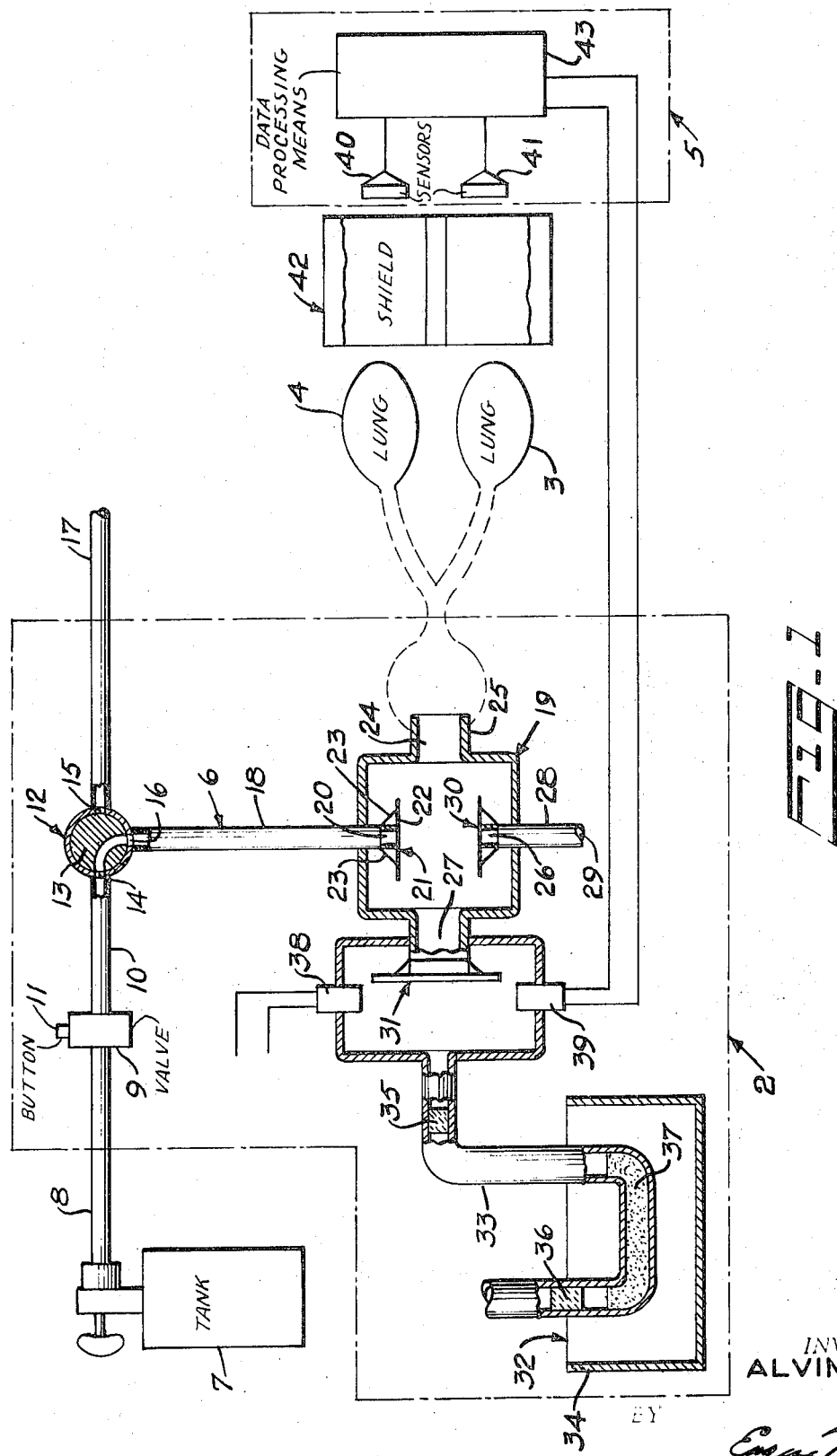
FIG. 1, is a diagram showing a dispensing system and a detecting system.

Referring now in detail to the drawings, wherein an embodiment of the invention is shown, and referring, particularly, to FIG. 1, the volumeter includes a dispensing system, generally designated by numeral 2, for dispensing a homogenous mixture of radioactive and non-radioactive gases to the external entryway of the trachea leading to the lungs, shown as numerals 3 and 4, in a patient. The detecting system generally designated by numeral 5, externally senses the radiation from each lung of the vertebrate or man and determines the volume and flow rate of gas in each lung. The method includes the dispensing of a known volume of the mixture from the calibrated measuring means 6 in the dispensing system to the external entryway to the trachea at the beginning of the patient's inhalation cycle in order to place the entire known volume of the mixture into the lungs. The known volume of the mixture will move deep into the lungs as a leading slug of gas, followed by a non-radioactive gas, such as air. The external radiation from the known volume of the mixture in each lung is sensed and the data or information is processed and stored in the detecting system 5. The known volume of radioactive gas is removed from the lungs by exhaling the mixture. Thereafter, the dispensing system dispenses a volume of the mixture into the mouth, trachea, and lungs of the patient during inhalation. This unknown volume of the mixture fills each lung. The external radiation from the unknown volume of the mixture in each lung is sensed and the data or information is accumulated. The accumulated and stored information is processed, as set forth herebelow, to determine the volume of each lung in absolute units. A second volume of each lung is determined at a different stage of respiration. The varying volumes of each lung are processed in the detecting system 5 to determine the gas flow rate for each lung.

The dispensing system 2 is connected to a source of the mixture, a tank 7. A homogenous mixture of radioactive xenon 133 gas and air may be utilized. The tank 7, containing the mixture under pressure, is connected to the dispensing system by pipe 8. The demand valve 9 is connected between pipe 8 and pipe 10. The demand valve 9 releases the mixture from tank 7 when there is a decrease in pressure in pipe 10. The demand valve 9 includes a purging control button 11 for manually releasing the mixture from tank 7. When purging control is depressed by an operator, the dispensing system is filled with the mixture and other gases may be purged from the system. Pipe 10 is connected to a two-way switching valve 12. The calibrated measuring means 6 is connected to the source of the mixture by way of valve 12. The valve includes a rotatable member 13 having an L-shaped opening therein. The rotatable member may be manipulated to connect the measuring means 6, through port 14, to the source of the radioactive mixture, as shown in FIG. 1, or to connect the measuring means 6, through port 15, to a source of a non-radioactive gas, or to block ports 14 and 15 in order to trap gas in the measuring means 6. The distal end of pipe 17 is open to the atmosphere.

The measuring means 6 is a calibrated volume. The measuring means 6 is used to measure out a known volume of the radioactive mixture before dispensing it into the lungs 3 and 4. The calibrated volume includes the volume of pipe 18 and the L-shaped opening in valve 12. The calibrated volume is calibrated between port 14 and the distal end of pipe 18, as shown in FIG. 1.

A dispensing valve means, generally designated by numeral 19, is connected to the distal end of the measuring pipe 18. The radioactive mixture may pass into the valve means 19 through port 20 at the distal end of pipe 18, when the pressure in the valve means 19 is lower than the pressure in the measuring means 6. Port 20 is covered by a one-way valve 21 having a body member 22 and biasing arms 23 connected to pipe 18. One-way valve 21 allows gas to flow from the measuring means 6 into valve means 19 but prevents gas from flowing from the valve means 19 into the measuring means 6.

The valve means 19 includes a connecting or dispensing port 24. The connecting port 24 connects the valve means 19 to the mouth of the patient. The mouth piece 25 is used to dispense gas into the mouth, the trachea, and the lungs of a patient. Nose clips, not shown, may be used to block the patient's nostril openings.

The valve means 19 also includes a non-radioactive gas entrance port 26 and an exhaust 27. A pipe 28 is connected to port 26 to provide an opening for air, a non-radioactive gas, to pass into the valve means or dispensing valve 19. The air may pass through open port 29, pipe 28, and port 26 when purging the radioactive mixture from the lungs of the patient. A one-way valve 30, similar to valve 21, is connected to pipe 28 adjacent to port 26 to allow gas to pass into the dispensing valve 19 when port 29 is open and the pressure in dispensing valve 19 is less than atmosphere pressure. One-way valve 30 prevents gas in dispensing valve 23 from flowing out through port 26. Another one-way valve 31, similar to valve 21, is connected adjacent to exit port 27 to allow exhaust gases in dispensing valve 19 to pass out of the dispensing valve when the patient exhales.

A trapping device, generally designated by numeral 32, is connected to the exhaust port 27 for trapping water, carbon dioxide and the radioactive gas in the exhaust gases. The trapping means traps the radioactive gas for possible reuse and prevents the radioactive gas from contaminating the surrounding atmosphere. The trapping device includes trapping tube 33 and cooling means 34. Well-known water and carbon dioxide trapping means 35 and 36 are placed in tube 33. A radioactive gas trapping means 37 is placed in the tube between trapping means 35 and 36. When radioactive xenon 133 is used as the radioactive gas, a charcoal trapping material is placed in a portion of the tube 33 enclosed by cooling means 34, the cooling means may be a freezing unit or cooling bath. The cooling means 34 is used to lower the temperature of the charcoal trapping material in order to trap the radioactive xenon gas.

Triggering means 38 and 39, as shown in FIG. 1, may be incorporated into the dispensing system 2 to trigger various operations in the detecting system 5. Triggering means 38 and 39 are designed to detect the opening or closing of one way valve 31. When valve 31 opens or closes a beam of light between the light source 38 and the light sensitive element 39 is broken or established. The light sensitive element 39 transmits a signal to the detecting system 5. The signal is used to trigger various operations in the detecting system.

The radiation from a patient's lungs 3 and 4 is externally detected by sensing means 40 and 41 respectively. The sensing means are radioactive detectors. The field sensed by each detector is restricted by lead shielding means, generally designated as numeral 42. The shields encircle the path between the left lung 3 and the left detector 41, and encircle the path between the right lung 4 and right detector 40 in order to prevent detection of stray radiation. The detectors 40 and 41 are placed a distance from the patient's lungs in order to reduce possible error attributable to the fact that various particles of the radioactive material in each lung are at different distances from the detector. Since the radioactive material radiates a detectable value that is relative to the distance between the particle and the sensing means, possible detectable error is reduced by moving the detectors a distance from the lungs. Each detector senses the radiation from one of the patient's lungs. The sensed information is transmitted in the form of electrical impulses, one impulse for each ray detected, to the data processing means 43. The amount of radiation is measured by the number of impulses accumulated in a preset-time period in the data processing system.

Figure 2:
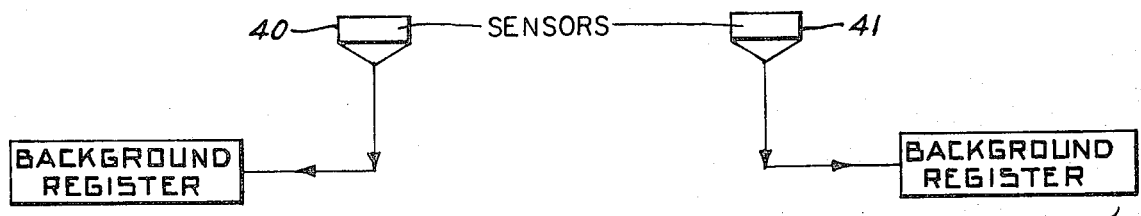
FIG. 2, is a block diagram illustrating the background radiation processing system.
Figure 3:
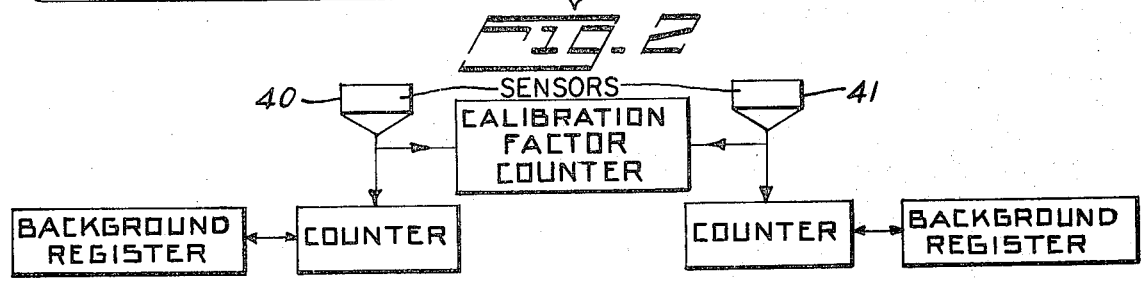
FIG. 3, is a block diagram illustrating the calibration factor processing system.

Now referring to FIGS. 2, 3, 4 and 5, the processing system is operated to obtain, first, the background radiation for each lung for a preset-time interval. The background radiation is determined, accumulated, and stored in terms of impulses or counts in a well-known impulse or count type register as referenced herebelow and, as illustrated in FIG. 2. Second, after the known volume of the radioactive mixture is placed in the lungs, the radiation from each lung is sensed for the preset-time interval and the impulses or counts detected are accumulated in a well-known counter, as referenced herebelow as illustrated in FIG. 3. The data being sensed from each lung in this second step is initially compared in a well-known comparator circuit, as illustrated by the double ended arrow, as referenced herebelow with the stored background counts for each lung respectively. When the data being sensed from each lung in the second step equals the stored background counts for each lung, the counter is reset to zero. Thereafter, the data sensed from each lung is accumulated, added together, and the sum of counts from both lungs is stored as a calibration factor in a calibration factor counter, a well known impulse or count type counter as referenced herebelow. The calibration factor data is a quantity of stored counts equal to the known volume of the radioactive mixture in the lungs.

Figure 4:
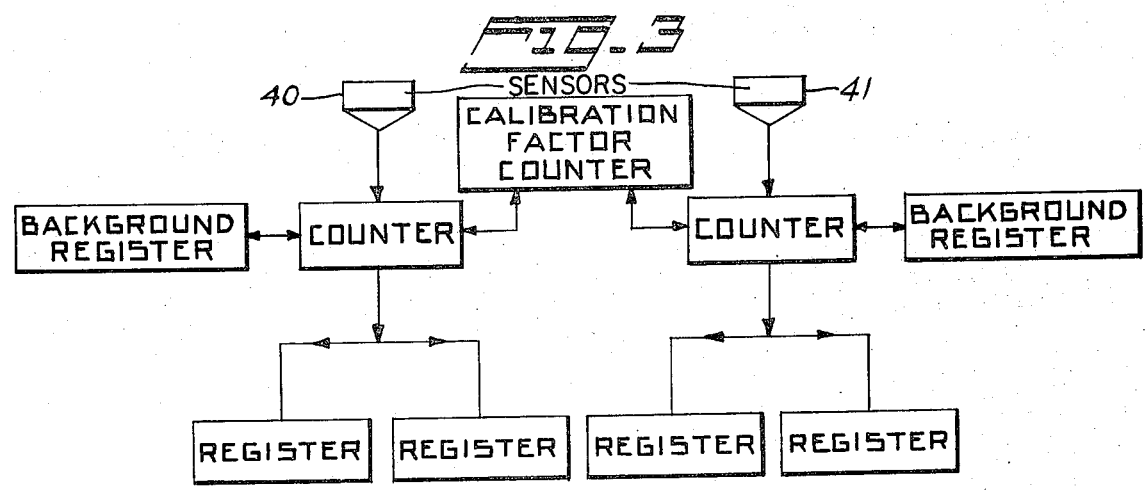
FIG. 4, is a block diagram illustrating the volume processing system.

Third, after the known volume of the radioactive mixture is purged from the lungs, the counters are reset to zero, and the lung cavities are filled with an unknown volume of the radioactive mixture, and the radiation from each lung is sensed for the preset-time interval, as illustrated in FIG. 4. The data being sensed from each lung in step four is initially compared with the stored background radiation counts for each lung respectively. When the data being sensed from each lung in the fourth step equals the stored background counts, the counter is reset to zero. Thereafter, the accumulated data sensed from each lung is compared with the accumulated and stored calibration factor data. Each time the incoming data from the unknown volume of radioactive material in each lung equals the calibration factor, a pulse is transmitted, accumulated and stored on a pair of well-known registers. Each stored pulse or digit represents a volume equal to the volume of the calibrated measuring means. The total number of digits and the percentage of a digit, if any, are stored in each register. One register of each pair of registers will visually represent the volume of each lung that is filled with the unknown volume of the radioactive mixture. The second register of each pair is utilized to provide flow rate data as set forth herebelow.

Figure 5:
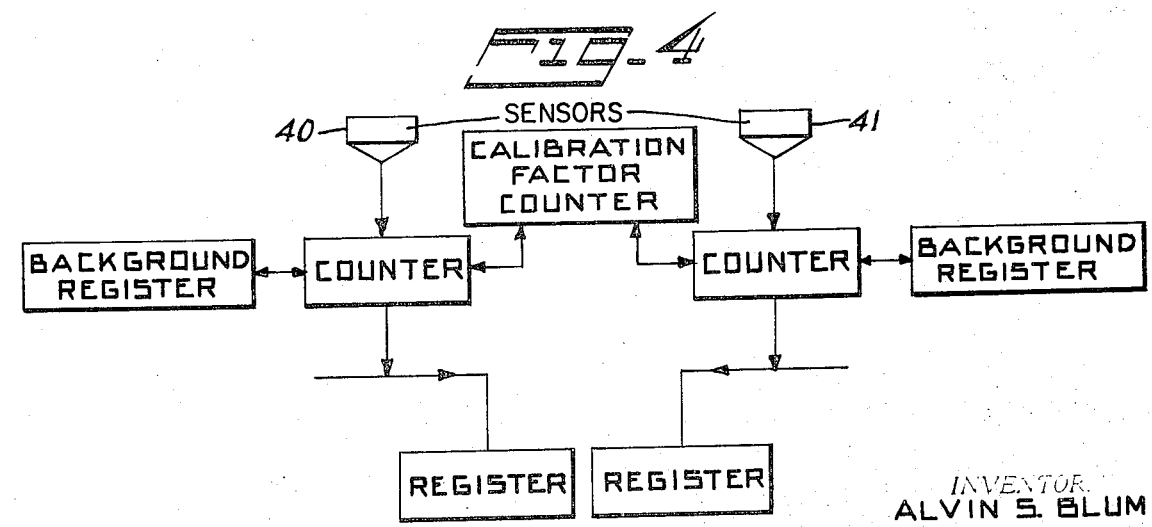
FIG. 5, is a block diagram illustrating the gas flow rate processing system.

Fourth, after the volume of each lung is obtained as described hereinabove, and the counters are reset to zero, a second volume is determined. The second volume, is substracted from the first volume to provide the gas flow rate, that is the rate of change of volume of each lung during a specific time interval. After a specific time lapse from the beginning of exhalation, the radiation from each lung is sensed for the preset-time interval, as illustrated in FIG. 5. The data sensed from each lung is initially compared with the stored background radiation counts for each lung respectively. When the data being sensed from each lung in the fifth step equals the stored background counts, the counter is reset to zero. Thereafter, the accumulated data sensed from each lung is compared with the stored calibration factor data. Each time the incoming data from the unknown volume of radioactive material in each lung equals the calibration factor, a negative pulse is transmitted to the second register in each pair of registers to substract one digit. The second register automatically substracts the second volume from the stored first volume, leaving a visual representation of the volume of the gas removed from the lungs during exhalation. The volume of the gas exhaled during the specific time interval is the gas flow rate.

Referring now to FIG. 6, showing the detecting system that includes sensing means 40 and 41 and the data processing system, such as, the known Digital Equipment, P. D. P. 8 Computer, manufactured with copyrighted instructions in 1966; or Honeywell Corporation Model F 73 with copyrights in Feb., 1967; or Raython Model 855–0843 with copyright in Nov., 1966, connected to said sensing means, the sensing means or radiation detectors 40 and 41 are connected to switching devices 50 and 51 respectively. The radiation detectors are used to sense the radiation from the lung areas during the operation of the volumeter to determine the volume of each lung and the flow rate data from each lung in a patient. Each radiation detector may be actuated into operation manually by the operator or automatically by a triggering device in the dispensing system.

The radiation detectors sense the radiation for a preset-time period, for example, one half second. The sensed information is transmitted to the data processing means in the form of electrical impulses. The impulses or counts from the pulsatile measuring system are processed in digital form to obtain the volume of each lung and the flow rate of gas from each lung in absolute units.

The data processing system includes:
switching devices 50 and 51; background radiation registers 52 and 53, such as the counter described by Digital Equipment Corporation of Maynard Massachussetts in their Digital Flip Chip Modules Catalog, copyrighted 1965 on pages 19 and 20, connected to the respective switching devices; counters 54 and 55, such as the counter described on pages 19 and 20 of Digital Flip Chip Modules Catalog, copyrighted 1965, connected to the respective switching devices and connected to the respective background radiation registers 52 and 53 by comparator connections, designated by numerals 56 and 57, such as the comparator described on pages 32 and 33 of Digital Flip Chip Modules Catalog, copyrighted 1965, or comparator described on pages 30, 31, and 32 of the same publication may be used; calibration factor counter 58, such as the counter described on pages 19 and 20 of Digital Flip Chip Modules Catalog, copyrighted 1965, connected to both switching devices and connected to the respective counters 54 and 55 by comparator connections, designated by numerals 60 and 61, such as the comparator described on pages 32 and 33 of Digital Flip Chip Modules Catalog, copyrighted 1965, or comparator described on pages 30, 31, 32 of the same publication may be used; switching means 62 and 63, such as switching means shown on page 109 of Digital Flip Chip Modules Catalog, copyrighted 1965 connected to the respective counters 54 and 55; and a pair of registers 64–66 and 65–67 connected to the respective switching means 62 and 63 registers 64–65 may be of the type described on page 24 of Digital Flip Chip Modules Catalog, copyrighted 1965. Registers 66 and 67 may be of the type described on page 24 of the same publication which may be connected up as a binary up-down counter as described on page 20 of the same publication.

In use, the volumeter is operated in the following manner. The patient is placed adjacent the dispensing device. The sensing means 40–41 and the shields 42 are adjusted into place in relation to the patient. Thereafter the sensing means and data process system are activated. To determine the background radiation, as illustrated in FIG. 2 and shown in FIG. 6, the sensors 40 and 41 are operated to detect the background radiation for a preset-time interval. The sensed information is transmitted as electrical impulses through the respective switching means 50 and 51 to the background registers 52 and 53 respectively. The electrical impulses are accumulated and stored in the background registers 52 and 53.

The calibration factor is then determined. The calibration factor is a representation of the known volume of the radioactive mixture in the lungs of the patient in terms of accumulated impulses or counts of detected radiation. The dispensing system is operated to dispense a calibrated volume of the radioactive mixture into the lungs of the patient. The two way valve, shown in FIG. 1, is operated to connect port 14 with the port 16. The purging button 11 of the demand valve 9 is actuated in order to fill measuring means 6 with the homogenous mixture of radioactive and non-radioactive gases. Valve means 12 is manipulated to shut off the entrance way to the measuring means 6 so that a decrease in pressure in valve 19 will not effect the calibrated volume of the mixture in the measuring means 6. The valve means 19 is purged to remove all radioactive gas by moving air through the valve means 19 into the trap 32. Then the patient places his lips over mouthpiece 25. The patient breathes through his mouth by inhaling air through port 26 and exhaling air through port 27. While the patient is still exhausting gas from his lungs, valve 12 is again manipulated to connect port 15 to port 16 and the entrance port 29 in pipe 28 is closed by the operator. As the patient begins to inhale, the low pressure in valve 19 opens valve 21 and the known volume of the mixture in the measuring means 6 moves through valve 19 deep into the patient's lungs. The known volume of the mixture is followed by non-radioactive gas, such as air, flowing through port 15. This procedure insures that the total known volume of the mixture moves into the patient's lungs.

The detecting system is activated. The sensors 40 and 41 detect the radiation from each lung for the preset-time interval, as specifically illustrated in FIG. 3 and shown in FIG. 6. The sensed information is transmitted to the respective counters 54 and 55. The sensed information is compared through comparator means 56 and 57 with the stored background information in registers 52 and 53, as the counters 54 and 55 receive the sensed information. When the counts registered in each counter equal the stored background counts, the counters 54 and 55 are reset to zero. Thereafter, the sensed data from each lung is transmitted through switching devices 50 and 51 directly to the calibration factor counter 58. The data from both lungs is accumulated, summed and stored in calibration factor counter 58 as the calibration factor.

If an additional background radiation reading is desired after determining the calibration factor, the background registers 52 and 53 are reset to zero. The new background radiation reading is obtained, after the radioactive mixture is purged from the lungs, in the same manner as the original background radiation, as illustrated in FIG. 2 and described above. If the operator elects to utilize the orginial background count during the entire operation the background registers 52 and 53 are not reset to zero.

To determine the volume of each lung, the known volume of the radioactive mixture is removed from the lungs by the patient exhaling through port 27 into trap 32 to remove moisture, carbon dioxide, and the radioactive gas from the exhaust gas. The patient inhales air in a normal manner through port 26 during the purging operation. After valve 12 is manipulated in order to connect port 14 and port 16, the control button 11 on the demand valve 9 is actuated to remove air from the measuring means 6 and to fill the measuring means with the radioactive mixture. Thereafter, the dispensing system is operated to fill the patients lungs with the mixture of radioactive gas. The operator closes port 29 in pipe 28 as the patient exhales. When the patient inhales, the pressure drop in valve 19 will cause valve 21 to open, causing a pressure drop in pipe 10 that operates demand valve 9. The mixture will be dispensed from the tank 7, filling the lungs of the patient with the radioactive mixture, except for the residual volume of air in the lungs and the air left in the trachea, mouth and valve 19. If the volume of each lung is determined immediately, from full exhalation to full inhalation, the volumeter will register volume of the radioactive gas in the lungs, that is, the vital capacity of each lung less the volume of the trachea, mouth and valve 19 due to the air left in the trachea, mouth and valve 19. After the lungs are filled with the radioactive mixture, each lung will be sensed and the sensed radiation, in impulse form will be transmitted to counters 54 and 55 through switches 50 and 51.

The initial counts accumulated in counters 54 and 55 are compared through comparator means 56 and 57 with the stored background radiation counts in registers 52 and 53 respectively. When the initial accumulated counts in counters 54 and 55 equal the background radiation counts in registers 52 and 53, the counters 54 and 55 are reset to zero. Thereafter, accumulated counts are compared, through comparator means 60 and 61, with the counts stored on the calibration factor counter 58. Each time the accumulated counts in each counter 54 and 55 equals the counts stored in the calibration factor counter, a pulse will be transmitted through switching means 62 and 63 to the pair of registers 64–66 and 65–67 respectively. The number of pulses and the percentage of a pulse, if any, visually registers the volume of the right lung on register 64 and the volume of left lung on register 65. The volume measurement, described above, is obtained while the patient holds his breath. Therefore, the maximum or minimum volumes of each lung may be easily detected. If the lungs are sensed for the preset-time interval while the patient is exhaling or inhaling, the volume detected will be the volume of the lungs at an intermediate point during the preset-time interval.

The gas flow rate of each lung may be determined after the first volume of each lung is determined, as set forth hereinabove. The first volume of each of the patient's lungs was determined after the lung cavities were filled with an unknown volume of the radioactive mixture. The lungs were sensed while the patient held his breath. A second volume may be determined after the counters 54 and 56 are reset to zero and after the patient begins exhaling the radioactive mixture. The second volume is determined after a specific time period after the patient begins to exhale the radioactive mixture. The triggering means 38 and 39 detects the beginning of the patient's exhalation cycle. A time delayed triggering signal is transmitted to the data processing means to initiate the sensing of the patient's lungs for the preset-time interval. The sensing means detects the radiation from each lung and transmits the data to the respective counters 54 and 55. The initial counts accumulated in the counters 54 and 55 are compared to the background radiation in registers 52 and 53 respectively. The comparison is made through comparator means 56 and 57 respectively. When the initial accumulated counts equal the background register counts the counters 54 and 55 are reset to zero. Thereafter, the accumulated data sensed from each lung is compared with the accumulated and stored calibration factor data through comparator means 60 and 61. Each time the incoming impulses or counts equal the counts in the calibration factor counter 58, a negative pulse is transmitted through switching means 62 and 63 respectively, to the flow rate registers 66 and 67. The negative pulses and the percentage of a pulse, if any, are substracted from the accumulated and stored counts that represent the first volume. The remainder equals the volume of the exhaled gases. The remainder per the specific time lapse equals the gas flow rate of each lung.

The gas flow rate may be visually represented on a strip chart recorder. The digital counting rate information in registers 66 and 67 is converted to analogue information and recorded as a signal varying continually with time on the strip chart recorder.

Also, lead shields of symmetrically selected shapes may be placed over selected portions of each lung area, to sense the radiation of portions of each lung. This data may be used for diagnosis even though the exact dimensions of the portions of each lung left uncovered are of unknown volume.

The processing system provides a non-complex apparatus and method for direct digital measurement of a parameter from a pulsatile input from a sensing system and for direct digital calibration and zeroing, if desired, and for direct digital readout of the measurement. The readout may be in absolute units. The item being sensed for measurement by the system may be the radioactivity from a radioactive gas, as described hereinabove, or other items or the weight, pressure, light variations and other similar measurements from other items. When the inputs being sensed are weight, pressure and other similar measurements, the sensing system converts the input data into a pulsatile output. Therefore, the disclosed processing system provides a non-complex processing system that may provide recalibration and rezeroing for each measurement of the item and for each measurement of different items.

Zeroing operation is to provide a net value. Zeroing, that is, background radiation as described hereinabove, or blank determination, or tare, as the case may be, is detected to provide data on the system prior to the sensing quantities of the item to be measured by the system.

The instant invention has been shown and described herein in what is considered to be the most practical and preferred embodiment. It is recognized, however, that departures may be made therefrom within the scope of the invention. Therefore, the instant invention is not to be limited to the details discussed herein but to be accorded the full scope of the claims so as to embrace any and all equivalent apparatus and articles.

What is claimed is:

1. A method of determining the volume of a lung in a patient comprising,
    dispensing a known volume of a radioactive gas into said lung of the patient,
    externally sensing the quantity of radiation emitted from the lung containing said known volume of said gas,
    dispensing an unknown volume of said gas to fill said lung after exhalation of said known volume of gas,
    externally sensing the quantity of radiation emitted from said lung filled with the unknown volume of said gas, and
    determining the volume of said lung by comparing the sensed quantity of radiation from said lung filled with the unknown volume of said gas with the sensed quantity of radiation from said lung containing said known volume of said gas.

2. An apparatus for determining the volume of a lung in a patient comprising,
    a means for holding a radioactive gas source,
    a dispensing system including a dispensing means connected to said means for holding and adapted to be connected to the patient for dispensing a known volume of a radioactive gas into the lung of a patient and for filling the lung of a patient with an unknown volume of said radioactive gas, said dispensing system including connecting means adapted to connect the patient to said dispensing system, and a detecting system including detecting means adapted to be placed operatively near the exterior of the patient's lung cavity, said detecting systems including a sensing means for sensing the quantity of radiation emitted from the lung containing said known volume of the radioactive gas, and for sensing the quantity of radiation emitted from said lung filled with the unknown volume of said radioactive gas.

3. An apparatus for determining the volume of each lung in a patient comprising, a means for holding a radioactive gas source, a dispensing system including a dispensing means connected to said source and adapted to be connected to the patient for dispensing a known volume of a radioactive gas into the lungs of a patient and for filling the lungs of a patient with an unknown volume of said radioactive gas, said dispensing system including connecting means adapted to connect the patient to said dispensing system, and a detecting system including detecting means adapted to be placed adjacent the exterior of the patient's lung cavity and operatively connected to said dispensing means, said detecting system including a sensing means for sensing the quantity of radiation emitted from the lungs containing said known volume of the radioactive gas, and for sensing the quantity of radiation emitted from each lung filled with the unknown volume of said radioactive gas, and processing means connected to said sensing means for comparing the sensed quantity of radiation emitted from each lung filled with said radioactive gas with the sensed quantity of radiation emitted from the lungs containing the known volume of said radioactive gas for determining the volume of each lung.

4. A method of determining the volume of each lung in a patient comprising, dispensing a known volume of a radioactive gas into the lungs of the patient, externally sensing the quantity of radiation emitted from the lungs containing said known volume of said gas, dispensing an unknown volume of said gas to fill each lung after exhalation of said known volume of gas, externally sensing the quantity of radiation emitted from each lung filled with the unknown volume of said gas, and determining the volume of each lung by comparing the sensed quantity of radiation from each lung filled with the unknown volume of said gas with the sensed quantity of radiation from the lungs containing said known volume of said gas.

5. A method of determining the volume of each lung in a patient as set forth in claim 4 wherein, the lungs are initially sensed externally to determine the background radiation emitted from the lungs prior to receiving radioactive gas, reducing the sensed quantities of radiation from the lungs containing radioactive gas to provide actual values.

6. A method of determining the volume of each lung in a patient as set forth in claim 4 which includes, dispensing the known volume of said gas at the beginning of inhalation to place said known volume of said gas into the lungs of the patient.

7. A method of determining the volume of each lung in a patient as set forth in claim 6 which includes, dispensing the known volume of said gas into an external opening in the body of the patient leading to the lungs.

8. A method of determining the volume of each lung in a patient as set forth in claim 7 which includes, sensing the radiation for a known time interval, and accumulating the quantities of sensed radiation in the form of counts.

9. A method of determining the volume of each lung in a patient as set forth in claim 8 which includes, determining the volume of each lung in absolute units by direct computation of the accumulated counts from the sensing of the radiation from each lung filled with said gas as a multiple of the accumulated counts from the sensing of the radiation from the lungs containing the known volume of the gas, and displaying the volume of each lung.

10. An apparatus for determining the volume of each lung in a patient comprising, a radioactive gas source, a dispensing system including a dispensing means connected to said source and adapted to be connected to the patient for dispensing a known volume of a radioactive gas into the lungs of a patient and for filling the lungs of a patient with an unknown volume of said radioactive gas, said dispensing system including connecting means adapted to connect the patient to said dispensing system, and a detecting system including detecting means adapted to be placed adjacent the exterior of the patient's lung cavity and connected to said dispensing means, said detecting system including a sensing means for sensing the quantity of radiation emitted from the lungs containing said known volume of the radioactive gas, and for sensing the quantity of radiation emitted from each lung filled with the unknown volume of said radioactive gas, and processing means connected to said sensing means for comparing the sensed quantity of radiation emitted from each lung filled with said radioactive gas with the sensed quantity of radiation emitted from the lungs containing the known volume of said radioactive gas for determining the volume of each lung.

11. An apparatus for determining the volume of each lung of a patient as set forth in claim 10 wherein, said dispensing system including control means to dispense the known volume of the radioactive mixture at the beginning of inhalation into an external opening in the body of the patient to place the known volume of said gas into the lungs.

12. An apparatus for determining the volume of each lung in a patient as set forth in claim 11 wherein, said sensing means senses the radiation from each lung to transmit a pulsatile signal to said processing system, and said processing system accumulates, stores and compares the quantity of radiation from each lung filled with the unknown volume of the radioactive gas with said quantity of the radiation from said lungs containing the known volume of the gas to determine the volume of each lung in absolute units.

13. An apparatus for determining the volume of each lung in a patient as set forth in claim 12 wherein,
said dispensing system includes a measuring means connected to said control means,
said measuring means provides a known volume of said radioactive gas, and
said control means dispenses the known volume of said gas into the lungs and dispenses the unknown volume of said gas into the lungs.

14. An apparatus for determining the volume of each lung of a patient as set forth in claim 13 wherein,
said sensing means senses the radiation from each lung filled with unknown volume of said radioactive gas at a second stage during breathing maneuvers, and
said processing system accumulates, stores and compares the quantity of radiation from each lung filled with the unknown volume of said radioactive gas at a second stage during breathing maneuvers with the total quantity of radiation from both lungs containing the known volume of said gas for determining the gas flow rate of each lung during the time lapse between the two sensing operations by determining the difference in the two volumes of each lung.

15. A method of determining the gas flow rate of each lung in a patient which consists in,
dispensing a known volume of a radioactive gas into the lungs of the patient,
externally sensing the quantity of radiation emitted from the lungs containing said known volume of said gas,
dispensing an unknown volume of said gas to fill each lung,
externally sensing the quantity of radiation emitted from each lung containing the unknown volume of said gas at two stages during breathing maneuvers,
determining the volume of each lung filled with said gas at each of the two stages by comparing the sensed quantity of radiation from each lung containing the unknown volume of said gas at each stage with the sensed quantity of radiation from the lungs containing said known volume of said gas, and
determining the gas flow rate of each lung during the time lapse between the two stages by determining the difference in volume of each lung at the two stages.

* * * * *